(12) United States Patent
Kim

(10) Patent No.: US 8,755,937 B2
(45) Date of Patent: Jun. 17, 2014

(54) POLICY-BASED ROBOT MANAGING APPARATUS AND METHOD FOR MANAGING A PLURALITY OF ROBOTS

(75) Inventor: Myung-Eun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 469 days.

(21) Appl. No.: 12/913,309

(22) Filed: Oct. 27, 2010

(65) Prior Publication Data

US 2011/0137459 A1 Jun. 9, 2011

(30) Foreign Application Priority Data

Dec. 8, 2009 (KR) ........................ 10-2009-0121188

(51) Int. Cl.
| | | |
|---|---|---|
| *G05B 19/418* | (2006.01) | |
| *G05B 13/00* | (2006.01) | |
| *G05B 99/00* | (2006.01) | |

(52) U.S. Cl.
USPC ............ 700/248; 700/245; 700/255; 700/246

(58) Field of Classification Search
USPC ................ 901/1–50; 706/1–62; 700/245–264
See application file for complete search history.

(56) References Cited

U.S. PATENT DOCUMENTS

| 6,266,577 | B1 * | 7/2001 | Popp et al. ..................... 700/248 |
| 2004/0030450 | A1 * | 2/2004 | Solomon ........................ 700/245 |
| 2005/0065652 | A1 * | 3/2005 | Sakagami et al. ............ 700/245 |
| 2005/0256610 | A1 | 11/2005 | Orita | |

FOREIGN PATENT DOCUMENTS

| JP | 2005-324278 | 11/2005 |
| JP | 2006-000954 | 1/2006 |
| JP | 2008-238383 | 10/2008 |
| KR | 10-2007-0107454 | 11/2007 |

* cited by examiner

*Primary Examiner* — Bhavesh V Amin
(74) *Attorney, Agent, or Firm* — Staas & Halsey LLP

(57) ABSTRACT

The present invention relate to a policy-based robot managing apparatus and method for managing a plurality of robots, which generate a wide area policy for controlling cooperation between the plurality of robots connected by a network, compare the generated wide area policy with an existing wide area policy to check whether a conflict between the wide area policies occurs, convert the generated wide area policy into local policies applicable to the plurality of robots, and transmit the local policies to the corresponding robots, respectively. According to the embodiments of the present invention, since a policy-based management technique is introduced, it is possible to more efficiently control different kinds of robots having various forms through a wide area policy having a pseudo-code form even though a manager does not know previously set information of the individual network robots.

14 Claims, 3 Drawing Sheets

POLICY-BASED ROBOT MANAGING APPARATUS AND METHOD FOR MANAGING A PLURALITY OF ROBOTS

CROSS REFERENCE TO RELATED APPLICATIONS

This application claims priority to Korean Patent Application No. 10-2009-0121188 filed on Dec. 8, 2009, the entire contents of which are herein incorporated by reference.

BACKGROUND OF THE INVENTION

1. Field of the Invention

The present invention relates to a policy-based robot managing apparatus and method for managing a plurality of robots, and more particularly, to a policy-based apparatus and method for managing a plurality of robots that generates a wide area policy for managing and operating a plurality of different kinds of network robots and transmits and applies the generated wide area policy to the individual network robots.

2. Description of the Related Art

With the recent development of an industrial field, various forms of manufacturing robots capable of performing repetitive delicate assembly work or difficult tasks instead of humans have been developed. On the basis of this robot technology, various service robots are being developed with extension of a range of application of robots to service fields.

These service robots can be classified into personal service robots and professional service robots. The personal service robots can provide support services for the elderly, such as life support or walking assistance for the elderly, education services such as a private instructor or tools and materials for education, and domestic help services such as cleaning up or tidying up. The professional service robots mean robots used for public services or difficult work that humans cannot do, and include public service robots for a guide or helper robot, robots for dangerous work as extinguishing fires or life-saving, military robots, etc.

In order to enable those service robots to provide more complicated and elaborated services, the necessity of network robot technology in which a plurality of robots are connected by a network and performs one application service together have come into the focus, and as a result, the network robot technology has been developed. All network robots are connected to a server through a network. Each of the network robots and communication thereof can be controlled through the server. The network robots provide a complicated application service at a high level of difficulty even though it is difficult for the individual robots to provide the application service due to limitations of hardware platforms of the individual robots. The network robot technology can be effectively applied to professional service fields than personal support service fields. Since the network robot technology provides services through the cooperation of a plurality of robots, the importance of a robot server technology monitoring the statuses of robots providing services and remotely controlling the robots is being emphasized.

As robot application services are diversified and become complicated, interest in the robot server technology of controlling cooperation of a plurality of robots has increased, and associated technology has been developed. However, those kinds of technology are mainly limited to technology for managing a plurality of the same kind of robots. In particular, development of robot server technology capable of controlling a plurality of different kinds of robots is still at an early stage.

In order to use a plurality of different kinds of robots to provide a higher level of robot application service, development of technology capable of controlling and managing a plurality of different kinds of robots is needed.

SUMMARY OF THE INVENTION

In order to solve the above-mentioned problem, it is an object of the present invention to provide a policy-based robot managing apparatus and method for managing a plurality of robots, in which a robot managing server for providing various application services through the cooperation of a plurality of different kinds of network robots generates and applies a policy to control the individual network robots, thereby more efficiently managing the robots.

According to an embodiment of the present invention, it is provided a policy-based robot managing apparatus for managing a plurality of robots, the apparatus including: a policy generating unit configured to generate a wide area policy for controlling cooperation between the plurality of robots connected by a network; a policy checking unit configured to compare the generated wide area policy with an existing wide area policy to check whether a conflict between the wide area policies occurs; a policy converting unit configured to convert the generated wide area policy into local policies applicable to the plurality of robots; and a communicating unit configured to transmit the local policies to the corresponding robots, respectively.

The policy converting unit may check profile information on robots to which the generated wide area policy will be applied, and convert the generated wide area policy into commands executable in the individual robots to generate the local policies corresponding to the individual robots.

The profile information may include at least one of network set information on the plurality of robots and a list of commands on the corresponding robots.

The wide area policy may be recorded in a pseudo-code form.

When it is determined by the policy checking unit that a conflict between the generated wide area policy and the existing wide area policy occurs, the policy generating unit may generate another new wide area policy.

The policy-based robot managing apparatus may further include a storage unit which includes a robot profile storage unit configured to store profile information on the plurality of robots connected by the network, and a wide area policy storage unit configured to store the wide area policy.

When it is determined by the policy checking unit 130 that no conflicts between the generated wide area policy and the existing wide area policy occur, the policy checking unit may store the generated wide area policy in the wide area policy storage unit.

The plurality of robots may execute commands described in the local policies to operate according to the local policies.

According to another embodiment of the present invention, it is provided a policy-based robot managing method for managing a plurality of robots, the method including: generating a wide area policy for controlling cooperation between the plurality of robots connected by a network; comparing the generated wide area policy with an existing wide area policy to check whether a conflict between the wide area policies occurs; converting the generated wide area policy into local policies applicable to the plurality of robots; and transmitting the local policies to the corresponding robots, respectively.

The converting may include checking profile information on robots to which the generated wide area policy will be applied, and converting the generated wide area policy into commands executable in the individual robots to generate the local policies corresponding to the individual robots.

The profile information may include at least one of network set information on the plurality of robots and a list of commands on the corresponding robots.

The wide area policy may be recorded in a pseudo-code form.

When it is determined in the checking that a conflict between the generated wide area policy and the existing wide area policy occurs, in the generating, another new wide area policy may be generated.

The policy-based robot managing method may further include storing the generated wide area policy in a wide area policy storage unit when it is determined in the checking that no conflicts between the generated wide area policy and the existing wide area policy occur.

The policy-based robot managing method may further include executing commands described in the local policies in the plurality of robots such that the plurality of robots operate according to the local policies.

The policy-based robot managing method may further include receiving local policy execution results from the plurality of robots, and managing the plurality of robots on the basis of the received local policy execution results.

According to the embodiments of the present invention, since a policy-based management technique is introduced, it is possible to more efficiently control different kinds of robots having various forms through a wide area policy having a pseudo-code form even though a manager does not know previously set information of the individual network robots.

DETAILED DESCRIPTION OF THE PREFERRED EMBODIMENTS

Hereinafter, exemplary embodiments of the present invention will be described with reference to the accompanying drawings.

Figure 1:
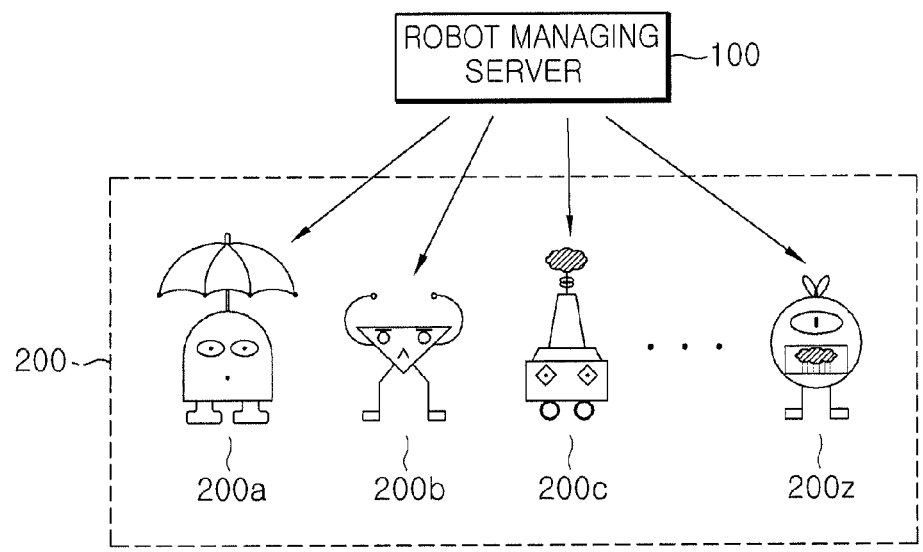
FIG. 1 is a drawing illustrating a configuration of a system adapting a policy-based robot control apparatus for controlling a plurality of robots according to an exemplary embodiment of the present invention.

FIG. 1 is a drawing illustrating a configuration of a system adapting a policy-based robot control apparatus for controlling a plurality of robots according to an exemplary embodiment of the present invention.

As shown in FIG. 1, a system adapting a robot control apparatus includes a plurality of robots 200a, 200b, 200c, ..., and 200z (generally designated by reference numeral 200) and a robot managing server 100 for controlling the plurality of robots 200a, 200b, 200c, ..., and 200z.

The robot managing server 100 stores information on each of the plurality of robots 200a, 200b, 200c, ..., and 200z and controls the operation of each of the robots 200 by extracting information on a robot 200 to be controlled and transmitting a control command to the corresponding robot 200.

At this time, the robot managing server 100 may separately control the plurality of robots 200a, 200b, 200c, ..., and 200z or may simultaneously control the plurality of robots 200a, 200b, 200c, ..., and 200z by generating a wide area policy.

A detailed configuration of the robot managing server 100 and its operation of controlling the plurality of robots 200a, 200b, 200c, ..., and 200z will be described with reference to FIG. 2.

Figure 2:
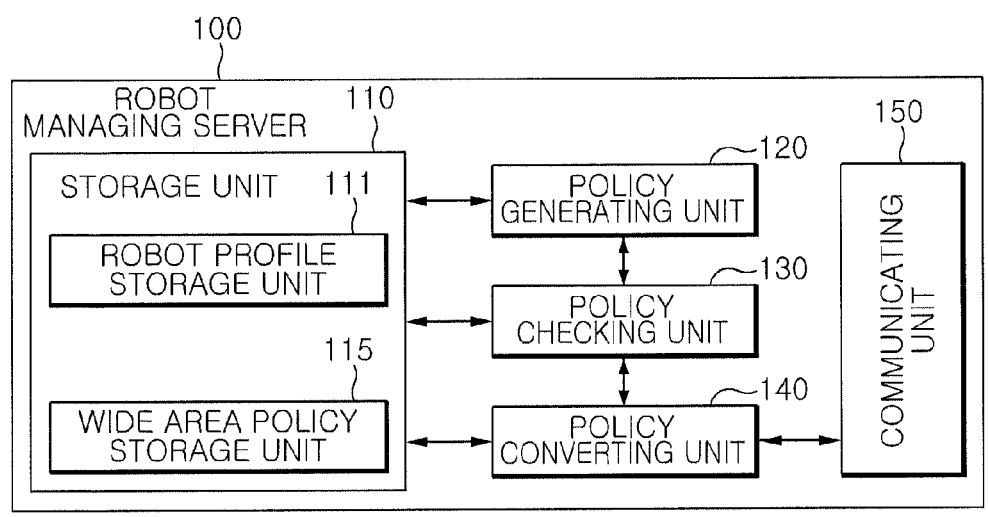
FIG. 2 is a block diagram illustrating a detailed configuration of the robot managing server according to the exemplary embodiment of the present invention.

FIG. 2 is a block diagram illustrating a detailed configuration of the robot managing server according to the exemplary embodiment of the present invention.

As shown in FIG. 2, the robot managing server 100 according to the embodiment of the present invention includes a storage unit 110, a policy generating unit 120, a policy checking unit 130, a policy converting unit 140, and a communicating unit 150.

The storage unit 110 includes a robot profile storage unit 111 and a wide area policy storage unit 115.

The robot profile storage unit 111 stores profile information on each of the plurality of robots 200a, 200b, 200c, ..., and 200z connected to the robot managing server 100 by a network. It is possible that the robot profile storage unit 111 has previously stored profile information on robots that were connected to the robot managing server 100 in the past but were not currently connected to the robot managing server 100.

At this time, the profile information of a robot 200 includes network set information on the corresponding robot 200, a list of commands to the corresponding robot 200, etc.

The wide area policy storage unit 115 stores a wide area policy generated by the policy generating unit 120.

The policy generating unit 120 generates a wide area policy for controlling cooperation between the plurality of robots 200a, 200b, 200c, ..., and 200z connected by the network. At this time, the policy generating unit 120 generates the wide area policy for controlling cooperation between the plurality of robots 200a, 200b, 200c, ..., and 200z in a pseudo-code form.

If the policy generating unit 120 generates the wide area policy, the policy checking unit 130 compares the wide area policy newly generated by the policy generating unit 120 with an existing wide area policy stored in the wide area policy storage unit 115 in advance. At this time, the policy checking unit 130 checks whether a conflict between the newly generated wide area policy and the existing wide area policy occurs.

If a conflict between the newly generated wide area policy and the existing wide area policy occurs, the policy checking unit 130 informs the policy generating unit 120 of the conflict so as to make the policy generating unit 120 generate another new wide area policy.

Meanwhile, if no conflicts between the newly generated wide area policy and the existing wide area policy occur, the policy checking unit 130 stores the newly generated wide area policy in the wide area policy storage unit 115.

If the checking by the policy checking unit 130 is completed, the policy converting unit 140 converts the newly generated wide area policy into a form applicable to the plurality of robots 200a, 200b, 200c, ..., and 200z.

That is, the policy converting unit 140 checks robots 200 to which the newly generated wide area policy will be applied, and reads the profile information on the corresponding robots 200 from the robot profile storage unit 111. Next, the policy converting unit 140 converts the newly generated wide area policy into commands that the individual robots 200 can execute, thereby generating local policies for the corresponding robots 200.

The communicating unit 150 checks the connection status of the plurality of robots 200a, 200b, 200c, . . . , and 200z through the network. Further, the communicating unit 150 transmits the local policies generated by the policy converting unit 140 to the corresponding robots 200, respectively.

Figure 3:
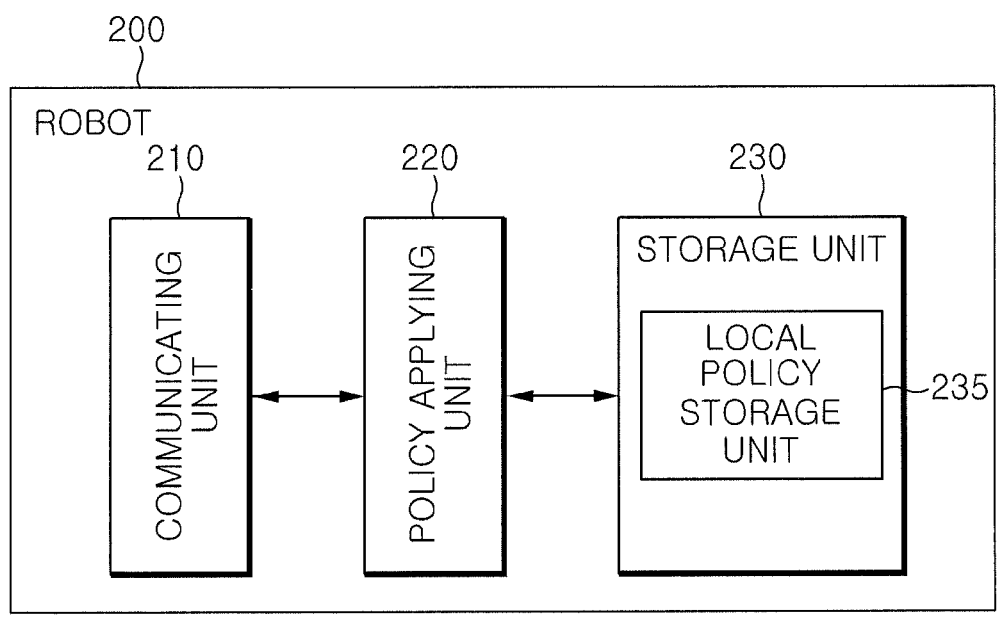
FIG. 3 is a block diagram illustrating a detailed configuration of a robot according to the exemplary embodiment of the present invention.

Meanwhile, FIG. 3 is a block diagram illustrating a detailed configuration of a robot according to the exemplary embodiment of the present invention.

As shown in FIG. 3, a robot 200 includes a communicating unit 210, a policy applying unit 220, and a storage unit 230.

First, the communicating unit 210 connects to the robot managing server 100 through the network and checks the connection status with the robot managing server 100. Further, the communicating unit 210 receives the local policy from the robot managing server 100 and transmits the local policy to the policy applying unit 220.

The storage unit 230 stores set information on the corresponding robot 200. Further, the storage unit 230 includes a local policy storage unit 235 for storing the local policy received through the communicating unit 210.

If receiving the local policy through the communicating unit 210, the policy applying unit 220 stores the received local policy in the local policy storage unit 235.

Further, the policy applying unit 220 applies the local policy to the corresponding robot 200. In other words, the policy applying unit 220 executes the command described in the local policy to control the operation of the corresponding robot 200.

Next, the policy applying unit 220 transmits the local policy execution result to the robot managing server 100.

The embodiment of the present invention having the above-mentioned configuration operates as follows.

Figure 4:
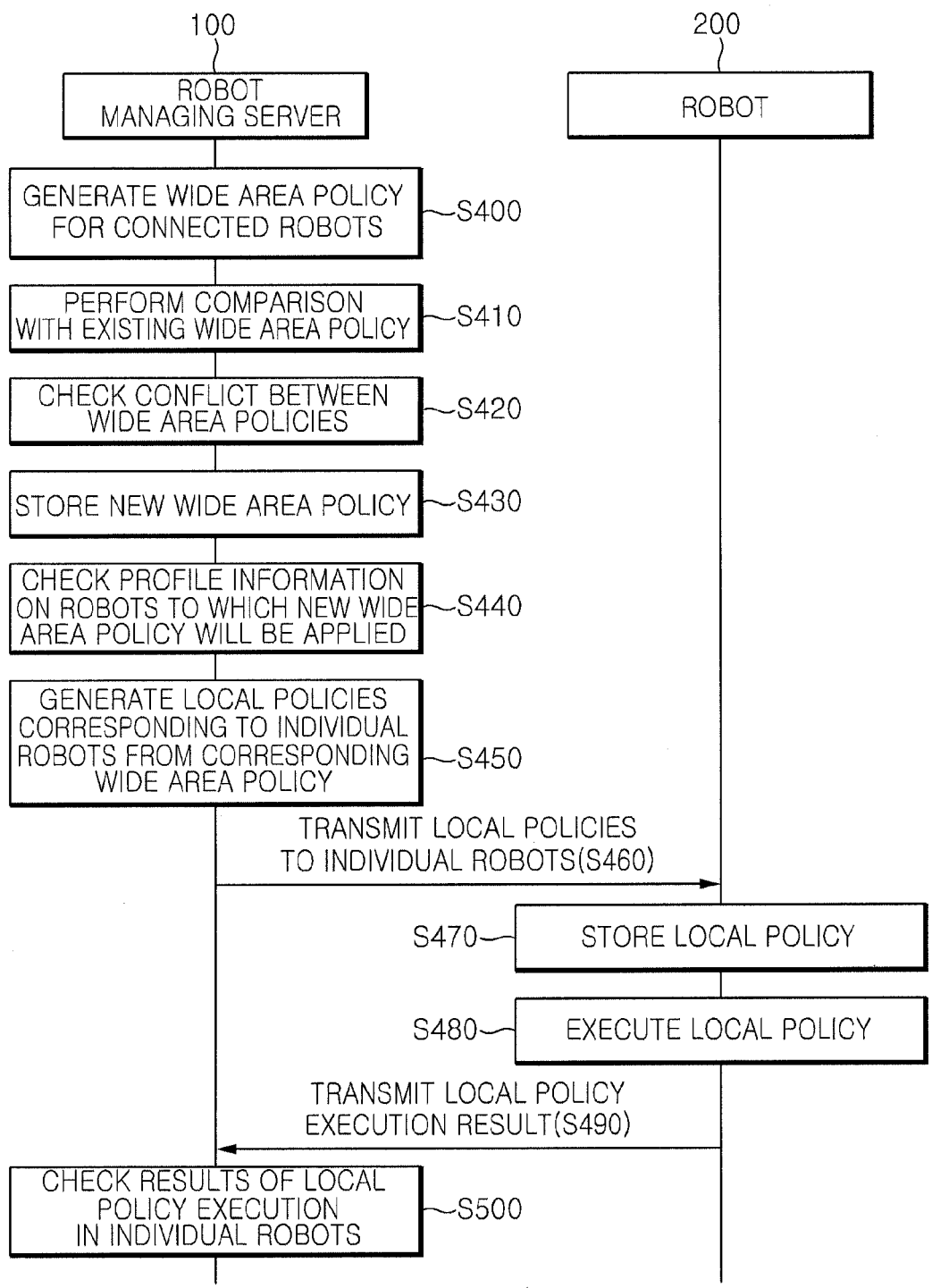
FIG. 4 is a drawing illustrating an operational flow of a policy-based robot managing method of managing a plurality of robots.

FIG. 4 is a drawing illustrating an operational flow of a policy-based robot managing method of managing a plurality of robots.

As shown in FIG. 4, if the policy generating unit 120 generates a wide area policy for controlling cooperation between the plurality of robots 200a, 200b, 200c, . . . , and 200z connected by the network (S400), the policy checking unit 130 compares the wide area policy newly generated by the policy generating unit 120 with the existing wide area policy (S410).

At this time, the policy checking unit 130 checks whether a conflict between the newly generated wide area policy and the existing wide area policy occurs (S420). If any conflicts between the newly generated wide area policy and the existing wide area policy do not occur, the policy checking unit 130 stores the newly generated wide area policy in the wide area policy storage unit 115 (S430).

If a conflict between the newly generated wide area policy and the existing wide area policy occurs, the policy checking unit 130 informs conflict information to the policy generating unit 120. In this case, the policy generating unit 120 returns to step 'S400' to generate another new wide area policy.

If the checking of the policy checking unit 130 is completed, the policy converting unit 140 checks the profile information on robots 200 to which the newly generated wide area policy will be applied (S440), and converts the newly generated wide area policy into commands that the individual robots 200 can execute, thereby generating local policies for the corresponding robots 200 (S450).

Next, the communicating unit 150 transmits the local policies generated in Step S450 to the corresponding robots, respectively (S460).

Meanwhile, if receiving the local policy from the robot managing server 100, each of the robots 200 stores the received local policy in the local policy storage unit 235 (S470).

Further, the policy applying unit 220 of the corresponding robot 200 executes the command described in the local policy to control the operation of the corresponding robot 200 according to the local policy (S480). Next, the corresponding robot 200 transmits the local policy execution result to the robot managing server 100 (S490).

The robot managing server 100 manages the individual robots 200 on the basis of the local policy execution results received from the robots 200 (S500). If there is a robot 200 that fails to execute the local policy, the policy converting unit 140 generates another local policy for the corresponding robot 200 and transmits the generated local policy to the corresponding robot 200.

Although the exemplary embodiments of the present invention have been described above with reference to the accompanying drawings, they are used in a generic and descriptive sense only and not for purposes of limitation. It will be apparent to those skilled in the art that modifications and variations can be made in the present invention without deviating from the spirit or scope of the invention.

What is claimed is:

1. A policy-based robot managing apparatus to manage a plurality of robots, the apparatus comprising:
   a policy generating unit configured to generate a wide area policy to control cooperation between the plurality of robots connected by a network;
   a policy checking unit configured to compare the generated wide area policy with an existing wide area policy pre-stored in a wide area policy storage unit to check whether a conflict between the wide area policies occurs;
   a policy converting unit configured to convert the generated wide area policy into local policies applicable to the plurality of robots; and
   a communicating unit configured to transmit, using the network, the local policies to the corresponding robots, respectively, and
   wherein the policy generating unit generates another new wide area policy when the policy checking unit determines that a conflict between the generated wide area policy and the existing wide area policy occurs.

2. The policy-based robot managing apparatus according to claim 1, wherein:
   the policy converting unit checks profile information on robots to which the generated wide area policy will be applied, and converts the generated wide area policy into commands executable in the individual robots to generate the local policies corresponding to the individual robots.

3. The policy-based robot managing apparatus according to claim 2, wherein:
   the profile information includes at least one of network set information on the plurality of robots and a list of commands on the corresponding robots.

4. The policy-based robot managing apparatus according to claim 1, wherein:
   the wide area policy is recorded in a pseudo-code form.

5. The policy-based robot managing apparatus according to claim 1, further comprising:
   a storage unit that includes
   a robot profile storage unit configured to store profile information on the plurality of robots connected by the network, and
   a wide area policy storage unit configured to store the wide area policy.

6. The policy-based robot managing apparatus according to claim 5, wherein:
   when it is determined by the policy checking unit that no conflicts between the generated wide area policy and the existing wide area policy occur, the policy checking unit stores the generated wide area policy in the wide area policy storage unit.

7. The policy-based robot managing apparatus according to claim 1, wherein:
   the plurality of robots execute commands described in the local policies to operate according to the local policies.

8. A policy-based robot managing method for managing a plurality of robots, the method comprising:
   generating a wide area policy for controlling cooperation between the plurality of robots connected by a network;
   comparing the generated wide area policy with an existing wide area policy pre-stored in a wide area policy storage unit to check whether a conflict between the wide area policies occurs;
   converting the generated wide area policy into local policies applicable to the plurality of robots; and
   transmitting the local policies to the corresponding robots, respectively, and wherein, when determining in the checking that a conflict between the generated wide area policy and the existing wide area policy occurs, in the generating, another new wide area policy is generated.

9. The policy-based robot managing method according to claim 8, wherein:
   the converting includes
   checking profile information on robots to which the generated wide area policy will be applied, and
   converting the generated wide area policy into commands executable in the individual robots to generate the local policies corresponding to the individual robots.

10. The policy-based robot managing method according to claim 9, wherein:
    the profile information includes at least one of network set information on the plurality of robots and a list of commands on the corresponding robots.

11. The policy-based robot managing method according to claim 8, wherein:
    the wide area policy is recorded in a pseudo-code form.

12. The policy-based robot managing method according to claim 8, further comprising:
    when determining in the checking that no conflicts between the generated wide area policy and the existing wide area policy occur, storing the generated wide area policy in a wide area policy storage unit.

13. The policy-based robot managing method according to claim 8, further comprising:
    executing commands described in the local policies in the plurality of robots such that the plurality of robots operate according to the local policies.

14. The policy-based robot managing method according to claim 8, further comprising:
    receiving local policy execution results from the plurality of robots; and
    managing the plurality of robots on the basis of the received local policy execution results.

* * * * *